(12) United States Patent
Webber

(10) Patent No.: US 6,347,348 B1
(45) Date of Patent: *Feb. 12, 2002

(54) BUFFER MANAGEMENT SYSTEM HAVING AN OUTPUT CONTROL CONFIGURED TO RETRIEVE DATA IN RESPONSE TO A RETRIEVAL REQUEST FROM A REQUESTING ONE OF A PLURALITY OF DESTINATIONS

(75) Inventor: Thomas P. Webber, Petersham, MA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/108,918

(22) Filed: Jun. 30, 1998

(51) Int. Cl.[7] .............................................. G06F 13/14
(52) U.S. Cl. .............................. 710/52; 710/54; 710/56
(58) Field of Search ..................................... 710/52–57

(56) References Cited

U.S. PATENT DOCUMENTS 4,715,030 A * 12/1987 Koch et al. ................. 370/401
5,778,180 A * 7/1998 Gentry et al. ............... 709/212
5,812,775 A * 9/1998 Seters et al. ................ 709/213

OTHER PUBLICATIONS

IBM Technical Disclosure Bulletin, "Buffer Pools: Sharing a Common Resource with Guarantees", vol. 37, No. 7, Jul. 1994, pp. 95–97.*

* cited by examiner

Primary Examiner—Thomas Lee
Assistant Examiner—Ilwoo Park
(74) Attorney, Agent, or Firm—Bromberg & Sunstein LLP

(57) ABSTRACT

A buffer management subsystem receives data from one or more source processes for transfer to one or more destination processes. The buffer management subsystem includes a buffer memory and a buffer pointer FIFO that associated with one of the destination process. The buffer pointer FIFO stores pointers to buffers in the buffer memory which are available to be used to store data from the source process(es) for transfer to the respective associated destination process. When data is received from a source process for transfer to a destination process, a buffer pointer is retrieved from the buffer pointer FIFO associated with the destination process and used in storing the data in the buffer pointed to by the buffer pointer. When the data is retrieved from the buffer for transfer to the destination process, the buffer pointer to the buffer is returned to the buffer pointer FIFO.

18 Claims, 2 Drawing Sheets

BUFFER MANAGEMENT SYSTEM HAVING AN OUTPUT CONTROL CONFIGURED TO RETRIEVE DATA IN RESPONSE TO A RETRIEVAL REQUEST FROM A REQUESTING ONE OF A PLURALITY OF DESTINATIONS

FIELD OF THE INVENTION

The invention relates generally to the field of digital systems, such as digital computer systems, digital communication systems and the like, more particularly to arrangements for managing buffers which are used to store data. The buffers may be used, for example, to temporarily store data received from one element of the system prior to being transferred to another element of the system. The invention provides an system and method for efficiently allocating buffers for use in storing data from a pool of empty buffers using one or more FIFOs which contain pointers to empty buffers.

BACKGROUND OF THE INVENTION

In a number of types of digital systems, such as digital computer systems, digital communication systems and the like, data provided by one element of a system, operating as a source is temporarily stored in buffers before being transferred to another element, operating as a destination which is to utilize the data in some manner. For example, in a digital computer system, a source may comprise a process in which data to be transferred to a storage device local to the digital computer system or to another digital computer system, is generated and organized for transmission, and a destination may comprise a process in which the data from the source retrieves the data and actually performs the transfer. In such an illustrative system, the source will provide the data to destination through a buffering arrangement, in which the source stores the data that it generates in a buffer store intermediate the source and destination, from which the destination will retrieve the data for transmission. Storing the data to be transferred in such a buffering arrangement allows the source and destination to operate at different instantaneous rates, irrespective of the rate at which the other is operating. In addition, if multiple sources are providing data for transfer through a single destination, they can all use the same buffering arrangement to provide data to the destination, and, similarly, if a single source is providing data for transfer through multiple destinations, it can use a single buffering arrangement to provide data to all of the destinations.

Conventionally in buffering arrangements, a number of buffers are organized in one or more linked lists. In a linked list, the data associated with, for example, a source or a destination, is stored in a buffer or a series of buffers, with each buffers in a series including pointers which point to the next buffer in the series. In addition, in such a buffering arrangement, a free list is provided with empty buffers, which can be allocated to the lists for the respective sources or destinations when data to be buffered is received in the buffering arrangement. When a source provides data to be buffered in the buffering arrangement, an empty buffer from the free list is allocated for the data, by de-linking it from the free list and linking it to the list associated with the source or destination, after which the data can be stored in the newly-allocated buffer. When the destination retrieves data from a linked list, it retrieves the data from the respective buffers and thereafter links the data from which the buffers have been retrieved to the free list. Both of these processes require manipulating pointers in both the free list and the list associated with the source and destination.

While the use of linked lists is effective, it can be inefficient, particularly in connection with relatively small buffers. For example, the pointers which are used to organize the linked lists take up space in the buffers. In addition, manipulating the pointers when a buffer is allocated to one of the lists when data is received for storage, or returned to the free list when the data is retrieved by a destination, can take some time to perform.

SUMMARY OF THE INVENTION

The invention provides a new and improved system and method for efficiently allocating buffers in a digital data processing system from a pool of empty buffers using one or more FIFOs which contain pointers to empty buffers.

In brief summary, a buffer management subsystem in accordance with the invention receives data from one or more source processes for transfer to one or more destination processes. The buffer management subsystem includes a buffer memory and a buffer pointer FIFO that is associated with one of the destination processes. The buffer pointer FIFO stores pointers to buffers in the buffer memory which are available to be used to store data from the source process(es) for transfer to the respective associated destination process. When data is received from a source process for transfer to a destination process, a buffer pointer is retrieved from the buffer pointer FIFO associated with the destination process and used in storing the data in the buffer pointed to by the buffer pointer. When the data is retrieved from the buffer for transfer to the destination process, the buffer pointer to the buffer is returned to the buffer pointer FIFO.

BRIEF DESCRIPTION OF THE DRAWINGS

This invention is pointed out with particularity in the appended claims. The above and further advantages of this invention may be better understood by referring to the following description taken injunction with the accompanying drawings, in which:

DETAILED DESCRIPTION OF AN ILLUSTRATIVE EMBODIMENT

Figure 1:
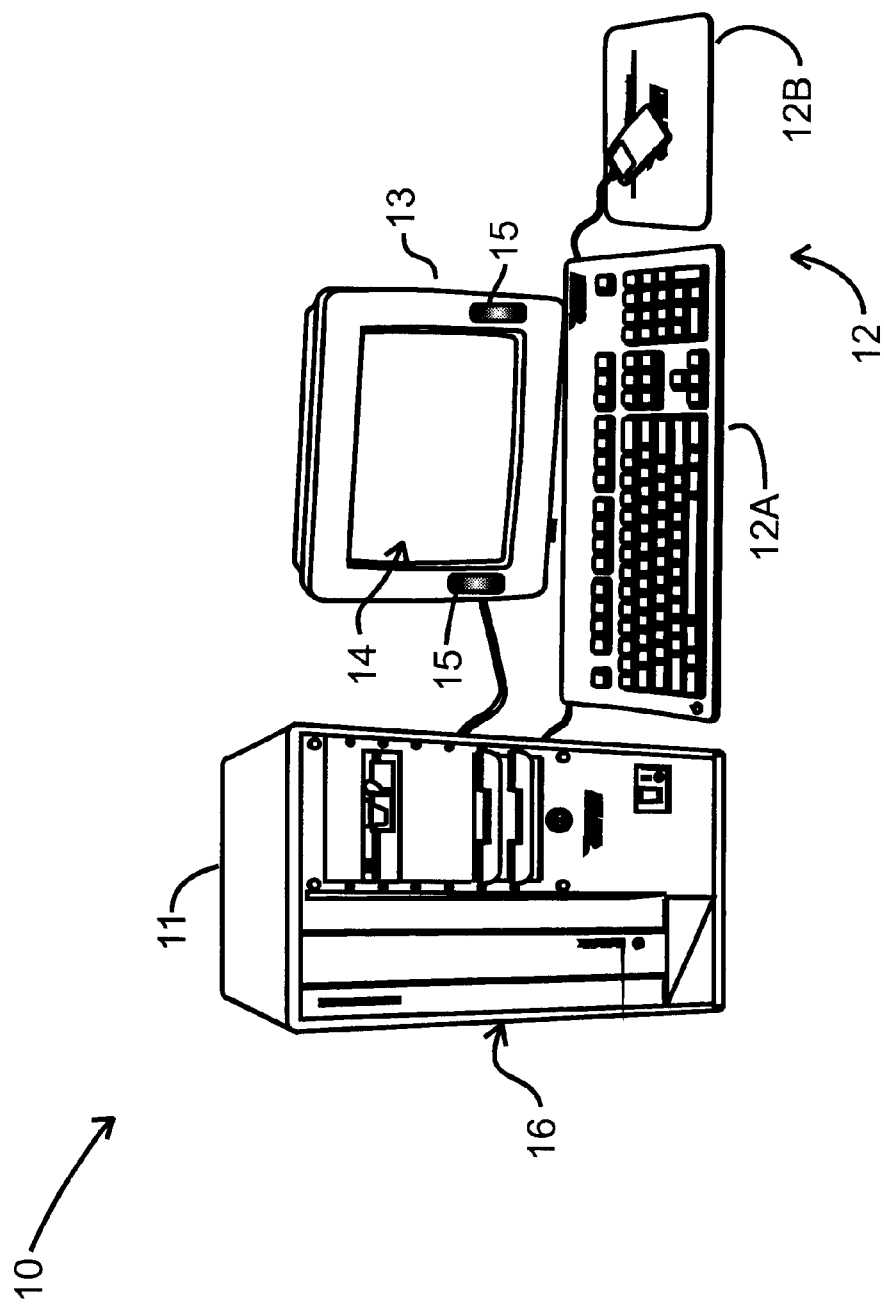
FIG. 1 depicts an illustrative digital computer system including a buffer management subsystem construct accordance with the invention.

FIG. 1 depicts an illustrative computer system 10 including a buffer management subsystem constructed in accordance with the invention. With reference to FIG. 1, the computer system 10 in one embodiment includes a processor module 11 and operator interface elements comprising operator input components such as a keyboard 12A and/or a mouse 12B (generally identified as operator input element(s) 12) and operator output components such as a video display device 13 with integral speakers 15. The illustrative computer system 10 is of the conventional stored-program computer architecture.

The processor module 11 includes, for example, processor, memory and mass storage devices such as disk and/or tape storage elements (not separately shown) which perform processing and storage operations in connection with digital data provided thereto. The mass storage subsystems may include such devices as disk or tape subsystems, optical disk storage devices and CD-ROM devices in which information may be stored and/or from which information may be retrieved. One or more of the mass storage subsystems may utilize removable storage media which may be removed and installed by an operator, which may allow the operator to load programs and data into the digital computer system 10 and obtain processed data therefrom. Under control of control information provided thereto by the processor, information stored in the mass storage subsystems may be transferred to the memory for storage. After the information is stored in the memory, the processor may retrieve it from the memory for processing. After the processed data is generated, the processor may also enable the mass storage subsystems to retrieve the processed data from the memory for relatively long-term storage.

The operator input element(s) 12 are provided to permit an operator to input information for processing and/or control of the digital computer system 10. The video display device 13 and speakers 15 are provided to, respectively, display visual output information on a screen 14, and audio output information, which are generated by the processor module 11, which may include data that the operator may input for processing, information that the operator may input to control processing, as well as information generated during processing. The processor module 11 generates information for display by the video display device 13 using a so-called "graphical user interface" ("GUI"), in which information for various applications programs is displayed using various "windows." Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

In addition, the processor module tr may include one or more network or communication ports, generally identified by reference numeral 16, which can be connected to communication links to connect the computer system 10 in a computer network, or to other computer systems (not shown) over, for example, the public telephony system. The ports enable the computer system 10 to transmit information to, and receive information from, other computer systems and other devices in the network.

The invention provides a buffer management subsystem useful in the digital computer system 10 depicted in FIG. 1, to facilitate buffering of data received from one or more source processes which is to be provided to one or more destination processes. In on e embodiment, the buffer management subsystem is used in a communications subsystem to buffer data received from one or more source processes for retrieval by one or more destination processes. The source processes can generate data to be transferred for local storage on one or more storage devices, such as disk storage devices or the like, which are maintained by the digital computer system 10 itself. In addition, the source processes can generate data to be transferred through a network port 16 over a network (not shown) for remote storage. The destination processes retrieve the data from the buffer management subsystem to perform the transfer, with one of the destination processes control the transfer for local storage and another of the destination processes controlling the transfer for remote storage.

Figure 2:
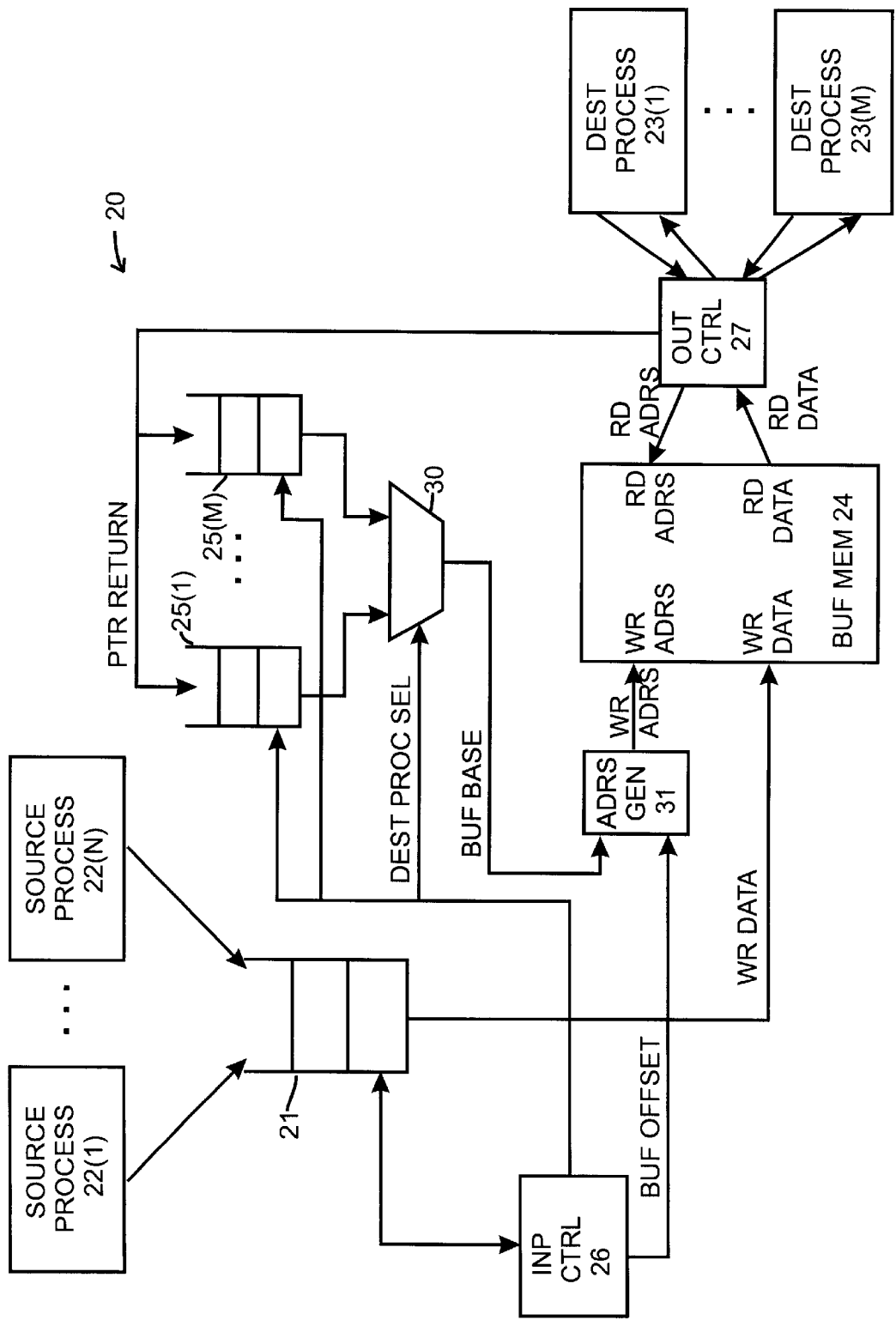
FIG. 2 is a functional block diagram of the buffer management subsystem in the digital computer system depicted in FIG. 1.

FIG. 2 depicts a buffer management subsystem 20 constructed in accordance with the invention. With reference to FIG. 2, the buffer management subsystem 20 includes an input FIFO (first in-first out buffer) 21 which receives data from one or more source processes 22(1) through 22(N) (generally identified by reference numeral 22(n)) for transfer t o one or more destination processes 23(1) through 23(M) (generally identified by reference numeral 23(m)). Data from the input FIFO 21 is transferred to a buffer memory 24 for buffer storage prior to being retrieved by the destination processes for transfer. The buffer memory 24 comprises a plurality of storage locations organized into a number of buffers (not separately shown). Each buffer comprises series of storage locations in the buffer memory 24 from a storage location identified by a base address. Each of the buffers is associated with one of the destination processes 23(m), so that data received from a source process 22(n) for transfer to a destination process 23(m) will be stored in one of the buffers associated with that destination process 23(m).

The buffer management subsystem 20 further has a number of FIFOs 25(m) through 25(M) (generally identified by reference numeral 25(m)), each of which is associated with a correspondingly-indexed one of the destination processes 23(m) and provides storage for buffer pointers pointing to buffers in the buffer memory 24 into which data from the input FIFO 21 for the associated destination process. Each buffer pointer points to the base address for the respective buffer in the buffer memory 24. When, under control of an input control module 26, data is transferred from the input FIFO 21 to the buffer memory 24 for storage, it (that is, the input control module 26) identifies the destination process 23(m) which is to receive the data and enables the buffer pointer FIFO 25(m) associated with th at destination process 23(m) to provide a buffer pointer for use in generating, storage addresses in the buffer memory 24 for the data. On the other hand, when, under control of an output control module 27, data is transferred from a buffer in the buffer memory to a destination process 23(m), it (that is, the output control module 27) will retrieve the data and then load a pointer to the buffer from which the data was retrieved in the buffer pointer FIFO 25(m) that is associated with the destination process 23(m) for which the data was retrieved. Thus, after data has been stored in a buffer by the input control module 26, and before it is retrieved by the output control module 27, the buffer pointer FIFO 25(m) associated with the destination process 23(m) will not contain a pointer to the buffer in which the data is stored, so that the input control module 26 will not re-use the buffer until the data has been retrieved by the output control module 27.

More specifically, when the input control module 26 enables data to be transferred from the input FIFO 21 to the buffer memory 24 for buffer storage, it will initially identify the destination process 23(m) to which the data is to be transferred and generate a DEST PROC SEL destination process select signal indicative thereof The DEST PROC SEL signal enables the one of the buffer pointer FIFOs 25(m) associated with the destination process 23(m) to provide a buffer pointer to one input of a multiplexer 30. The DEST PROC SEL signal also enables the multiplexer 30 to couple the buffer pointer provided by the buffer pointer FIFO 25(m) associated with the destination process 23(m) as a BUFF BASE buffer base signal to one input of an address generator 31. Thereafter, the input control module 26 will enable the input FIFO 21 to transfer the data to buffer memory as WR DATA write data signals. Contemporaneously, the input control module 26 will provide BUF OFFSET buffer offset signals which the ad dress generator 31 will use, along with the BUF BASE signal, in generating a WR_ADRS write address signal to identify the storage location in the buffer memory 24 in which the data represented by the WR DATA write data signal is to be stored. Thus, as the input control module 26 enables successive words of data, represented by the WR DATA write data signal, to be stored in successive locations in the buffer memory 24, the input control module 26 will generate the BUF OFFSET buffer offset signal so as to identify successive storage locations in the buffer memory 24 comprising, the buffer pointed to by the BUF BASE signal. After the input control module 26 has enabled the data to be stored in the buffer, it will enable the FIFO 25(m) associated with the destination process 23(m) to advance to the next pointer, if any, which is stored therein, in which case the pointer that was used to provide the BUF BASE signal will no longer be in the FIFO 25(m).

On the other hand, when the output control module 27, in response to a request from a destination process 23(m) to retrieve data from the buffer memory 24 for transfer to the destination process 23(m), it will provide a RD_ADRS read address signal identifying storage locations in the buffer memory 24 for a buffer associated with the destination process 23(m), generally starting from the first location for the buffer in the buffer memory 24. The buffer memory 24 will, in response, provide a RD DATA signal comprising the data from the storage location identified by the RD_ADRS signal, which, in turn, the output control module 27 will provide to the destination process 23(m). After the data has been retrieved from the buffer, the output control module will generate a PTR_RETURN pointer return signal, comprising the buffer pointer for the buffer from which data was just retrieved, which it loads into the FIFO 25(m) associated with the destination process for which the data was just retrieved.

The invention provides a number of advantages. In particular, the invention provides a buffer management subsystem 20 in which buffers associated with respective destination processes can be managed in a relatively simple manner, by storing buffer pointers for buffers in which data can be stored in a FIFO, instead of more complex arrangements such as linked lists and the like.

It will be appreciated that a number of modifications may be made to the buffer management subsystem 20 as described in connection with FIG. 2. For example, although the buffer management subsystem 20 has been described as being used in connection with multiple source processes 22(n) and multiple destination processes 23(m), it will be appreciated that the subsystem 20 may be used in connection with a single source process and/or a single destination process. If the buffer management subsystem 20 is used with a single destination process, it will be appreciated that a single buffer pointer FIFO 25(m) will be provided, in which case the multiplexer 30 may be omitted.

In addition, although the buffer management subsystem 20 has been described as including an output control module 27, it will be appreciated that, if the buffer memory 24 has a plurality of read ports, each for receiving a read address and for providing read data, corresponding to the number of destination processes 23(m), each destination process can connect directly to the buffer memory and retrieve data therefrom. In that case, each destination process 23(m), after it retrieves data from a buffer, will load the buffer pointer for the buffer in the buffer pointer FIFO 25(m) associated therewith.

Furthermore, although the buffer management subsystem 20 has been described such that the buffer pointer for a buffer from which data is being retrieved will be loaded into the buffer pointer FIFO 25(m) after all of the data has been retrieved from the buffer, it will be appreciated that the buffer pointer may be loaded into the buffer pointer FIFO 25(m) at an earlier time, which can allow the input control module 26 to begin loading data into the buffer while the previously-loaded data is being retrieved from the buffer. On the other hand, the loading of the buffer pointer in the respective buffer pointer FIFO 25(m) until some time after the data has been retrieved from the respective buffer, for example, after an acknowledgment has been received from a downstream process indicating receipt of the retrieved data.

In addition, it will be appreciated that, if the input control module 26, when it is to transfer data from the input FIFO 21 into a buffer associated with a particular destination process 23(m) determines that there are no buffer pointers in the buffer pointer FIFO 25(m) associated with the destination process 23(m), it can either stall until a buffer pointer is available, discard the data, or process other data for a destination process 23(m) for which a buffer pointer is available in the FIFO 25(m) associated therewith.

Furthermore, although the buffer management subsystem 20 has been described as using FIFOs 25(m) to store buffer pointers for buffers that are associated with the respective destination processes 23(m), it will be appreciated that other mechanisms, such as stacks (last in-first out) mechanisms can be used.

In addition, although the buffer management system 20 has been described as providing a FIFO 25(m) associated with one the destination processes 23(m), it will be appreciated that each FIFO may instead be associated with one of the source processes 22(n), or for respective pairs of source and destination processes.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A buffer management subsystem for buffering data received from a source to be provided to respective ones of a plurality of destinations, the buffer management subsystem comprising:

A. a buffer memory configured to include a plurality of buffers;

B. a plurality of available buffer pointer lists each associated with one of said destinations, each available buffer pointer list being configured to include a plurality of entries each configured to receive a buffer pointer pointing to an available one of said buffers;

C. an input control configured to, in response to receiving data from said source for transfer to one of said destinations, retrieve a buffer pointer from the available buffer pointer list associated with the one of said destinations and store said data in the buffer pointed to by the retrieved buffer pointer, the retrieval of the buffer pointer serving to remove the retrieved buffer pointer from the one of said available buffer pointer lists from which the retrieved buffer pointer was retrieved; and D. an output control configured to, in response to a retrieval request from a requesting one of said destinations, retrieve data from a respective one of said buffers associated with the requesting one of said destinations for transfer to the requesting one of said destinations, and to provide a buffer pointer pointing to the respective one of said buffers to the available buffer pointer list associated with the requesting one of said destinations.

2. A buffer management subsystem as defined in claim 1 in which the available buffer pointer list is in the form of a FIFO buffer.

3. A buffer management subsystem as defined in claim 1 in which the available buffer pointer list is in the form of a stack.

4. A buffer management subsystem as defined in claim 1 in which the output control is configured to provide the buffer pointer pointing to the available buffer pointer list after it has begun retrieving data from the respective one of said buffers.

5. A buffer management subsystem as defined in claim 1 in which the output control is configured to provide the buffer pointer pointing to the available buffer pointer list after it has retrieved all of the data from the respective one of said buffers.

6. A buffer management subsystem as defined in claim 1 in which said buffer memory includes a plurality of storage locations each identified by an address, each said buffer comprising a plurality of storage locations associated with a series of addresses, each buffer pointer comprising a base address for a respective one of said buffers.

7. A buffer management system according to claim 1, further comprising a multiplexer means, for selectively coupling an output of the multiplexer means to the buffer pointer from the available buffer pointer list associated with the one of said destinations.

8. A buffer management system according to claim 7, wherein the multiplexer means is a multiplexer.

9. A buffer management system according to claim 7, further comprising an address generator coupled to the output of the multiplexer means, for generating a write address signal based on the buffer pointer and control signals from the input control.

10. A buffer management method for buffering data received from a source to be provided to respective ones of a plurality of destinations in buffer memory configured to include a plurality of buffers, comprising the steps of:

A. providing a plurality of available buffer pointer lists each associated with a respective one of said plurality of destinations, each available buffer pointer list being configured to include a plurality of entries each configured to receive a buffer pointer to an available one of said buffers;

B. an input step in which, in response to receiving data from said source for transfer to one of said destinations, a buffer pointer is retrieved from the one of said available buffer pointer lists associated with said one of said destinations and said data is stored in the buffer pointed to by the retrieved buffer pointer, the retrieval of the buffer pointer serving to remove the retrieved buffer pointer from the one of said available buffer pointer lists from which the retrieved buffer pointer was retrieved; and C. an output step in which, in response to a retrieval request from a requesting one of said destinations, data is retrieved from a respective one of said buffers associated with the requesting one of said destinations for transfer to the requesting one of said destinations, and the buffer pointer pointing to the respective one of said buffers is provided to the available buffer pointer list associated with the requesting one of said destinations.

11. A buffer management method as defined in claim 10 in which the available buffer pointer list is in the form of a FIFO buffer.

12. A buffer management method as defined in claim 10 in which the available buffer pointer list is in the form of a stack.

13. A buffer management method as defined in claim 10 in which the output step includes the step of providing the buffer pointer pointing to the available buffer pointer list after retrieval of data from the respective one of said buffers has begun.

14. A buffer management method as defined in claim 13 in which the output step includes the step of providing the buffer pointer pointing to the available buffer pointer list after retrieval of data from the respective one of said buffers has completed.

15. A buffer management method as defined in claim 10 in which said buffer memory includes a plurality of storage locations each identified by an address, each said buffer comprising a plurality of storage locations associated with a series of addresses, each buffer pointer comprising a base address for a respective one of said buffers.

16. A buffer management method according to claim 10, wherein the input step includes selectively coupling, by a multiplexer means, the buffer pointer from the available buffer pointer list associated with the one of said destinations to an output of the multiplexer means.

17. A buffer management method according to claim 16, wherein the multiplexer means is a multiplexer.

18. A buffer management method according to claim 16, wherein the input step includes generating a write address based on the output of the multiplexer means.

* * * * *